United States Patent
Barnett (10) Patent No.: US 10,597,113 B2
(45) Date of Patent: Mar. 24, 2020

(54) MOTORCYCLE FRONT BRAKE MASTER CYLINDER ASSEMBLY

(71) Applicant: Robert L. Barnett, Santa Ana, CA (US)

(72) Inventor: Robert L. Barnett, Santa Ana, CA (US)

( * ) Notice: Subject to any disclaimer, the term of this patent is extended or adjusted under 35 U.S.C. 154(b) by 0 days.

(21) Appl. No.: 15/941,843

(22) Filed: Mar. 30, 2018

(65) Prior Publication Data

US 2018/0354579 A1    Dec. 13, 2018

Related U.S. Application Data (63) Continuation of application No. 14/941,362, filed on Nov. 13, 2015, now Pat. No. 9,932,086.

(60) Provisional application No. 62/079,217, filed on Nov. 13, 2014.

(51) Int. Cl.
*B62L 3/02* (2006.01)
*B60T 7/10* (2006.01)
*B62K 23/06* (2006.01)

(52) U.S. Cl.
CPC .............. *B62L 3/023* (2013.01); *B60T 7/102* (2013.01); *B62K 23/06* (2013.01); *B62L 3/02* (2013.01)

(58) Field of Classification Search
CPC . B62L 3/023; B62L 3/02; B60T 7/102; B62K 23/06
See application file for complete search history.

(56) References Cited

U.S. PATENT DOCUMENTS

| | | | |
|---|---|---|---|
| 2,152,065 A | 3/1939 | La Brie | |
| 3,935,930 A | 2/1976 | Kine | |
| 4,205,758 A | 6/1980 | Johnson | |
| 4,635,442 A | 1/1987 | Bass | |
| 4,909,131 A | 3/1990 | Nix et al. | |
| 5,050,381 A | 9/1991 | Matsuno et al. | |
| 5,247,852 A | 9/1993 | Guerr | |
| 5,813,501 A | 9/1998 | Terry, Sr. | |
| 6,336,525 B1 | 1/2002 | Leng | |
| 6,739,133 B2 | 5/2004 | Barnett | |
| 6,883,647 B1 * | 4/2005 | Wen | B62L 3/023 188/24.22 |
| 7,178,646 B2 | 2/2007 | Lumpkin | |
| 7,204,088 B2 | 4/2007 | Uchiyama et al. | |
| 7,503,237 B2 | 3/2009 | Cornolti et al. | |
| 7,530,435 B2 | 5/2009 | Lumpkin | |
| 7,546,909 B2 | 6/2009 | Campbell et al. | |
| 7,757,821 B2 | 7/2010 | Tetsuka et al. | |
| 7,832,531 B2 | 11/2010 | Hirose et al. | |
| 8,276,477 B2 | 10/2012 | Lavezzi et al. | |
| 8,336,308 B2 | 12/2012 | Gherardi et al. | |
| 8,408,090 B2 | 4/2013 | Weiher | |
| 8,943,924 B2 * | 2/2015 | Thomas | G05G 1/04 188/26 |

(Continued)

*Primary Examiner* — Bradley T King
*Assistant Examiner* — Mahbubur Rashid
(74) *Attorney, Agent, or Firm* — Knobbe Martens Olson & Bear LLP (57) ABSTRACT

A brake assembly has a lever configured to press a knee against a pushrod of a piston of a master cylinder assembly. The knee is configured to receive removable inserts that allow a user to modify the angle at which the lever activates the master cylinder assembly. The master cylinder assembly can include protrusions on the outer surface of the cylinder to protect the cylinder from impact damage.

13 Claims, 5 Drawing Sheets

(56) References Cited

U.S. PATENT DOCUMENTS

2003/0121739 A1* 7/2003 Lumpkin ................ B60T 11/22
                                                                    188/344
2007/0284203 A1* 12/2007 Tetsuka .................. B62L 3/023
                                                                    188/344
2009/0057092 A1   3/2009 Hayakawa et al.

* cited by examiner

MOTORCYCLE FRONT BRAKE MASTER CYLINDER ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to generally to hydraulic brake systems and, in particular, to a handbrake system for a motorcycle, dirt bike, or ATV.

Description of Related Art

Hydraulic brake systems often use an incompressible fluid to generate leverage for squeezing a brake pad against a rotor. In a hydraulic handbrake system, when the brake lever is squeezed, a pushrod exerts force on a piston in the master cylinder. Movement of the piston in the master cylinder seals off the bypass or compensation port, trapping fluid ahead of the piston. Further movement of the piston increases the pressure of the entire hydraulic system, forcing fluid through the hydraulic lines toward one or more calipers where the fluid acts upon one or two caliper pistons sealed by one or more seated O-rings that prevent leakage of the fluid.

Subsequent release of the brake lever allows a return mechanism (e.g., a spring in the master cylinder assembly) to return the master piston back into its rest position. This return action first relieves the hydraulic pressure on the caliper, then applies suction to the brake piston in the caliper assembly, moving it back into its housing and allowing the brake pads to release the rotor.

SUMMARY

The systems, methods and devices described herein have innovative aspects, no single one of which is indispensable or solely responsible for their desirable attributes. Without limiting the scope of the claims, some of the advantageous features will now be summarized.

An aspect of the present invention is a lever configured to compress a pushrod of a master cylinder assembly of a brake assembly, the lever having a removable insert that allows the leverage between the lever and the pushrod to be changed. In some aspects, the orientation of the removable insert within the lever can be changed to change the leverage between the lever and the pushrod. The brake assembly may include more than one inserts, with some, all, or none of the inserts providing a different leverage between the lever and the pushrod. In some aspects, the lever includes a knee portion, a handle portion, and a set screw that allows the position of the handle relative to the knee to be adjusted. In some aspects, the master cylinder assembly is coupled to a perch that secures the brake assembly to a handlebar of a motorcycle or ATV. In some aspects, the perch is positioned to overlap longitudinally with a pivot that connects the lever to the master cylinder assembly. In certain aspects, the master cylinder assembly includes protrusions on the outer surface of the cylinder to protect the cylinder from damage without increasing the entire wall thickness of the cylinder. In some aspects, the master cylinder assembly includes a guard that has a flange having a low clearance with a portion of the lever, with the flange operating as a wiper to remove debris from the lever as the lever is operated. In some aspects, a collar is inserted between the perch and the handlebar to allow the brake assembly to rotate about the handlebar during impact, thereby protecting the brake assembly from damage.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Overview

Figure 1:
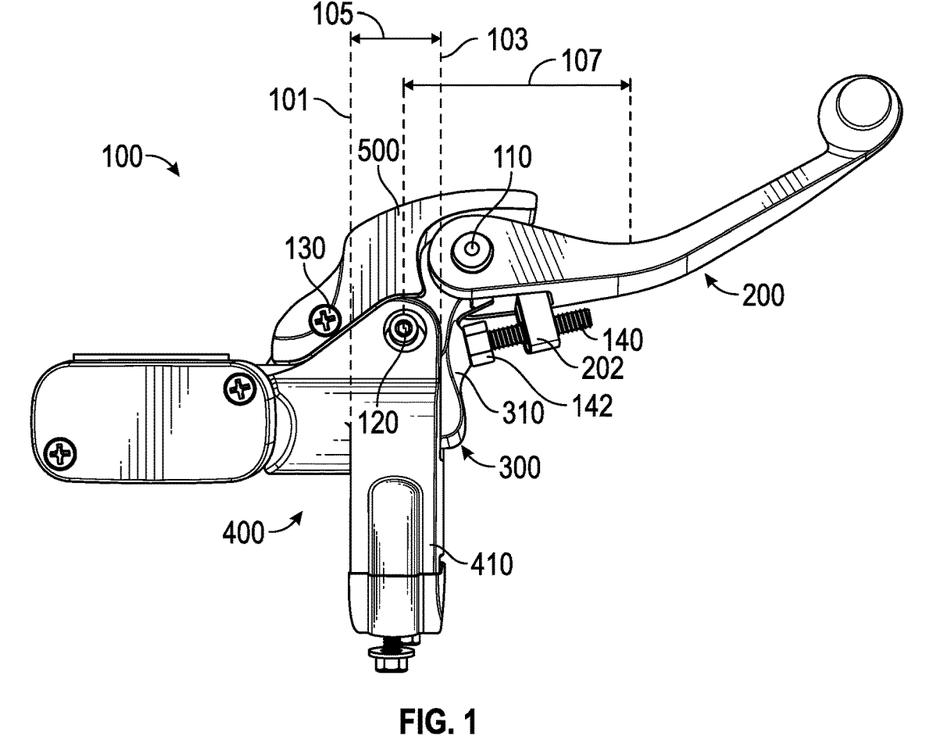
FIG. 1 is a top view of an embodiment of a hydraulic brake assembly.

FIG. 1 depicts a top view of a non-limiting, illustrative embodiment of a brake assembly 100. The brake assembly 100 can include a lever 200, a knee 300, a master cylinder assembly 400, and a guard 500. The lever 200 can be coupled to the knee 300 by a pin 110. In some variants, the brake assembly may not include a pin 110, with the lever 200 and the knee 300 being portions of a continuous, unitary structure. The pin 110 can be many different types of a fastener (e.g., a bolt, a weld). The lever 200 can be adapted to rotate about the pin 110. In some embodiments, the lever 200 can be restricted from rotating about the pin 110.

The knee 300 can be coupled to the master cylinder assembly 400 by a pivot 120. The pivot 120 can be many different types of a fastener (e.g., a bolt, a screw, a pin). The knee 300 can be adapted to rotate about the pivot 120.

The guard 500 can be secured to the master cylinder assembly 400 by a fastener 130. The fastener 130 can be many different types of a fastener (e.g., a bolt, a weld). In some variants, the guard 500 can be formed as a continuous, unitary structure of another component of the brake assembly 100 (e.g., the master cylinder assembly 400, the knee 300, the lever 200).

The master cylinder assembly 400 may include or be coupled to a perch 410 that is adapted to secure the brake assembly 100 to a secondary structure (e.g., handlebar). The brake assembly 100 can be configured so that a brake is applied when the lever 200 is moved in a first direction (e.g., toward the handlebar). The brake assembly 100 can be configured so that the brake is released when the lever 200 is moved in a second direction (e.g., away from the handlebar). The brake assembly 100 can be arranged so that the brake is applied when the lever 200 rotates in a first direction about the pivot 120, and the brake is released when the lever 200 rotates in a second direction about the pivot 120, with the first and second directions being opposite directions of rotation around the pivot 120.

The brake assembly 100 can be arranged so that the lever 200 pushes the knee 300 toward the master cylinder assembly 400 when the lever 200 moves toward the perch 410. As shown in FIG. 1, the brake assembly 100 can include an adjustment element 140. The adjustment element 140 can be adapted to allow adjustment of the rest position of the lever 200 relative to the knee 300. The adjustment element 140 can be coupled to the lever 200 by a coupling element 202 of the lever 200. The adjustment element 140 can engage a fin 310 on the knee 300. In some variants, the orientation of the adjustment element 140 can be flipped so that the adjustment element 140 couples to the knee 300 and engages a "fin-like" structure (not shown) on the lever 200.

Referring to FIG. 1, the adjustment element 140 can serve as an intervening structure through which the lever 200 can move the knee 300 toward the master cylinder assembly 400. In some embodiments, the lever 200 can move the knee 300 toward the master cylinder assembly 400 through a non-adjustable portion of the lever 200.

Master Cylinder Assembly

Figure 2:
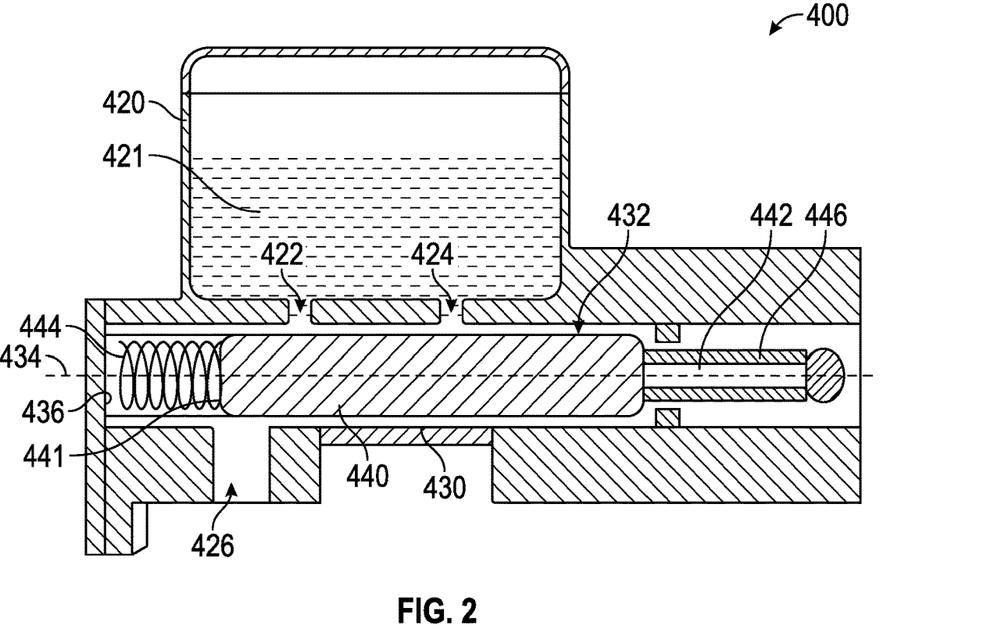
FIG. 2 is a rear cross-sectional view of the master cylinder assembly portion of the brake assembly of FIG. 1.

FIG. 2 depicts a rear cross-sectional view of a non-limiting, illustrative embodiment of the master cylinder assembly 400. The master cylinder assembly 400 can include a reservoir 420, a cylinder 430, and a piston 440. The reservoir 420 can be adapted to contain a liquid 421 (e.g., brake fluid). The cylinder 430 can surround a channel 432 that has a longitudinal axis 434. The channel 432 can be substantially cylindrical and surround the piston 440. The channel 432 can be adapted to have a small clearance between the cylinder 430 and the piston 440. The master cylinder assembly 400 can include an inlet port 422 through which the reservoir 420 can communicate with the channel 432. The master cylinder assembly 400 can include a compensating port 424 through which the reservoir 420 can communicate with the channel 432. The master cylinder assembly 400 can include an outlet port 426 through which the channel 432 can communicate with a hydraulic brake line (not shown).

The master cylinder assembly 400 can be arranged so that the piston 440 moves within the channel 432 along the longitudinal axis 434. The piston 440 can include, or be coupled with, a pushrod 442. The piston 440 can be coupled to the pushrod 442 by a flexible joint (not shown) that allows the pushrod 442 to articulate in one or more directions relative to the piston 440. The master cylinder assembly 400 can include a sealing element 446 that surrounds the pushrod 442. The sealing element 446 can be adapted to block the liquid 421 from flowing past the pushrod 442, as shown in FIG. 2.

The master cylinder assembly 400 can include a return spring 444. The return spring 444 can be arranged to be co-axial with the channel 432. The return spring 444 can be disposed between the piston 440 and the cylinder 430. As shown in FIG. 2, the return spring 444 can be disposed between a distal end surface 436 of the channel 432 and an end 441 of the piston 440. The return spring 444 can be configured to compress when a compression force is applied to the pushrod 442, thereby allowing the piston 440 to move toward the distal end surface 436 of the channel 432. The return spring 444 can be configured to supply a restoring force such that the piston 440 moves away from the distal end surface 436 of the channel 432 when the compression force applied to the pushrod 442 is reduced. The master cylinder assembly 400 can be configured such that movement of the piston 440 toward the distal end surface 436 of the channel 432 increases the pressure of the liquid 421 in the outlet port 426 and in the downstream hydraulic brake line (not shown). The master cylinder assembly 400 can be configured such that movement of the piston 440 away from the distal end surface 436 of the channel 432 decreases the pressure of the liquid 421 in the outlet port 426 and in the downstream hydraulic brake line (not shown). The brake assembly can be configured so that an increase in the pressure of the liquid 421 in the outlet port 426 activates the brake. The brake assembly can be configured so that a decrease in the pressure of the liquid 421 in the outlet port 426 releases the brake. As shown in FIG. 2, the piston 440 has moved toward the distal end surface 436, thereby increasing the pressure of the liquid 421 in the outlet port 426 and activating the brake.

Figure 3:
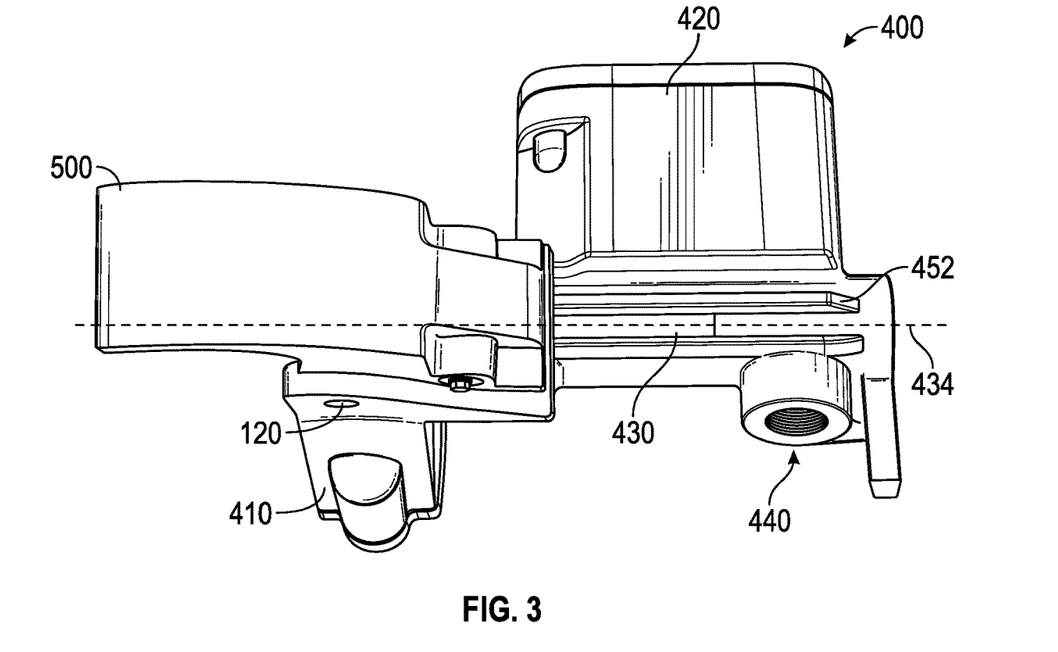
FIG. 3 is a upwardly-angled front view of the master cylinder assembly of FIG. 2.

FIG. 3 shows an upwardly-angled front view of the master cylinder assembly 400. The master cylinder assembly 400 can be secured to a perch 410. As shown in FIG. 3, the perch 410 can form a unitary structure with the master cylinder assembly 400. The perch 410 can be aligned with the pivot 120. In other words, a line that passes through the pivot 120 and is substantially perpendicular to the longitudinal axis 434 of the channel 432 can pass through at least a portion of the perch 410. As best seen in FIG. 1, the perch 410 can have a width 105, which is defined by an inboard position 101 of a first lateral surface of the perch and an outboard position 103 of a second lateral surface of the perch 410. The pivot 120 can be located between the first and second lateral surfaces of the perch 410. The perch 410 can be located inboard of the pivot 120 (e.g., toward the reservoir 420). The perch 410 can be located outboard of the pivot 120 (e.g., away from the reservoir 420). Positioning the perch 410 to be approximately in line with the pivot 120 allows standard "finger/pocket" positioning on the lever 200, which allows increased leverage on the lever 200. As seen in FIG. 1, the "finger/pocket" can have a leverage distance 107 with respect to the pivot 120. Although the "finger/pocket" positioning could also be achieved by sliding outboard an assembly having an inboard perch placement, the handlebar has a limited space available for mounting the brake assembly 100. For example, the handlebar is curved and must accommodate other components such as a handgrip, thereby limiting the space available for sliding the brake assembly 100 along the handlebar.

As shown in FIG. 3, the outer surface of the cylinder 430 may include one or more protrusions 452. The protrusion 452 can be in the form of a raised ridge that runs substantially parallel to a longitudinal axis 434 of the cylinder 430. However, the protrusion 452 need not be parallel to the longitudinal axis 434. The protrusion 452 may have a form other than linear (e.g., sinusoidal, zig-zag, punctate). In some variants, the protrusion 452 can be adapted to protect the cylinder 430 from becoming damaged due to impact of the cylinder 430 with an outside structure, such as, for example, flying debris (e.g., a rock). As discussed above, the clearance between the piston and the cylinder 430 can be small, making it likely that any deformation of the cylinder 430 can interfere with the piston moving back and forth within the cylinder 430. The protrusion 452 can be adapted to shield the outer surface of the cylinder 430 from coming into contact with an outside structure, thereby protecting the cylinder 430 from a deformation that could render inoperable the master cylinder assembly 400. The protrusion 452 can be adapted to help prevent rock damage to the cylinder 430 without increasing the entire wall thickness of the cylinder 430, thereby requiring a bigger rock to damage and render inoperable the cylinder 430.

Figure 4:
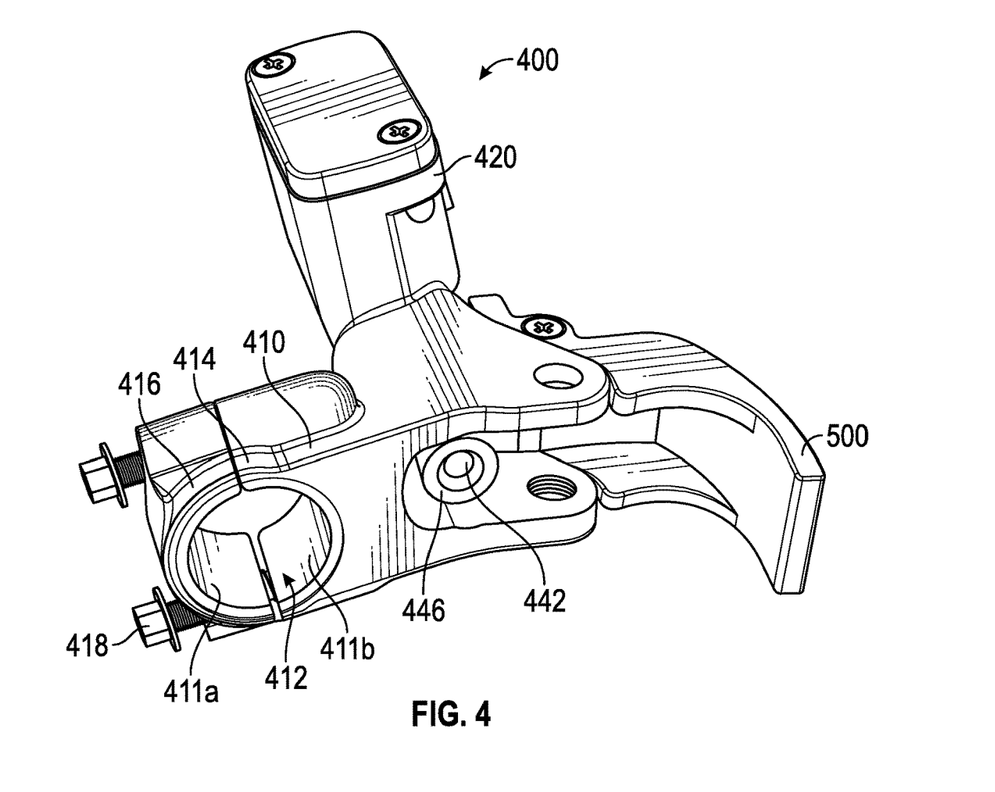
FIG. 4 is an isometric view of the guard and master cylinder assembly of FIG. 2.

FIG. 4 shows an isometric view of a non-limiting, illustrative embodiment of the master cylinder assembly 400. The perch 410 can surround an opening 412 through which a secondary structure can be passed. In some variants, the opening 412 can be adapted to allow a handle bar to be passed through the opening 412. The perch 410 can include a base portion 414 that partially circumferentially surrounds the opening 412. The perch 410 can include a cap portion 416 that partially circumferentially surrounds the opening 412. The perch 410 can include one or more clamp elements 418 that are configured to couple the cap portion 416 to the base portion 414. The clamp element 418 can be many different types of a fastener (e.g., a threaded screw). The perch 410 can be configured to allow the cap portion 416 to be completely removed from the base portion 414. The perch 410 can be adapted so that the cap portion 416 remains coupled to the base portion 410 when the clamp element 418 is at its fully opened configuration.

The perch 410 can include one, none, or more than one liners 411*a,b*. The liners 411*a,b* can be disposed immediately adjacent to the opening 412. The perch 410 can include a cap liner 411*a* and/or a base liner 411*b*. The liners 411*a,b* can be fused to the perch 410. In some variants, the liners 411*a,b* can be removable inserts. In at least one embodiment, the cap liner 411*a* can be a continuous, unitary structure with the base liner 411*b*. For example, the cap liner 411*a* and the base liner 411*b* can be in the form of a single liner that completely surrounds the opening 412, such as, for example, an annular sleeve. In some variants, the cap liner 411*a* and the base liner 411*b* can be in the form of a single liner that completely or only partially surrounds the opening 412, such as, for example, a slotted ring.

The liners 411*a,b* can comprise a material (e.g., polytetrafluoroethylene, nylon) that reduces the friction between the perch 410 and the secondary structure that is passed through the opening 412. The liners 411*a,b* can be adapted so that there is more consistent control of adjusted slippage of the brake assembly 100, allowing the tightness to be adjusted so that the brake assembly 100 will still rotate when impacted. The liners 411*a,b* can be adapted to allow the brake assembly 100 to rotate around the handlebar when impacted, thereby helping to protect the brake assembly 100 from damage resulting from an impact.

In some variants, the perch 410 is mounted to a secondary structure (e.g., handlebar) by loosening the clamp element 418 to increase an outer dimension of the opening 412, passing the secondary structure through the opening 412, and tightening the clamp element 418 to reduce the outer dimension of the opening 412. The perch 410 can be mounted by removing the cap portion 416 from the perch 410, seating the base portion 414 on the handlebar, reconnecting the cap portion 416 to the perch 410, and tightening the clamp element 418 to reduce an outer dimension of the opening 412, thereby securing the perch 410 to the handlebar. In some variants, the liners 411*a,b* can be a sleeve or broken ring that is positioned on the handlebar before mounting the perch 410 to the handlebar. In some embodiments, the liners 411*a,b* are inserts that are positioned within the perch 410 before, after, or during mounting the perch 410 to the handlebar.

As shown in FIG. 4, the pushrod 442 and sealing element 446 can extend toward the knee 300 (shown in FIG. 1) of the brake assembly. The pushrod 442 and sealing element 446 can be configured to articulate in any direction (e.g., toward the perch 410, toward the guard 500, toward a lateral surface 419 of the master cylinder assembly 400).

Knee

Figure 5A:
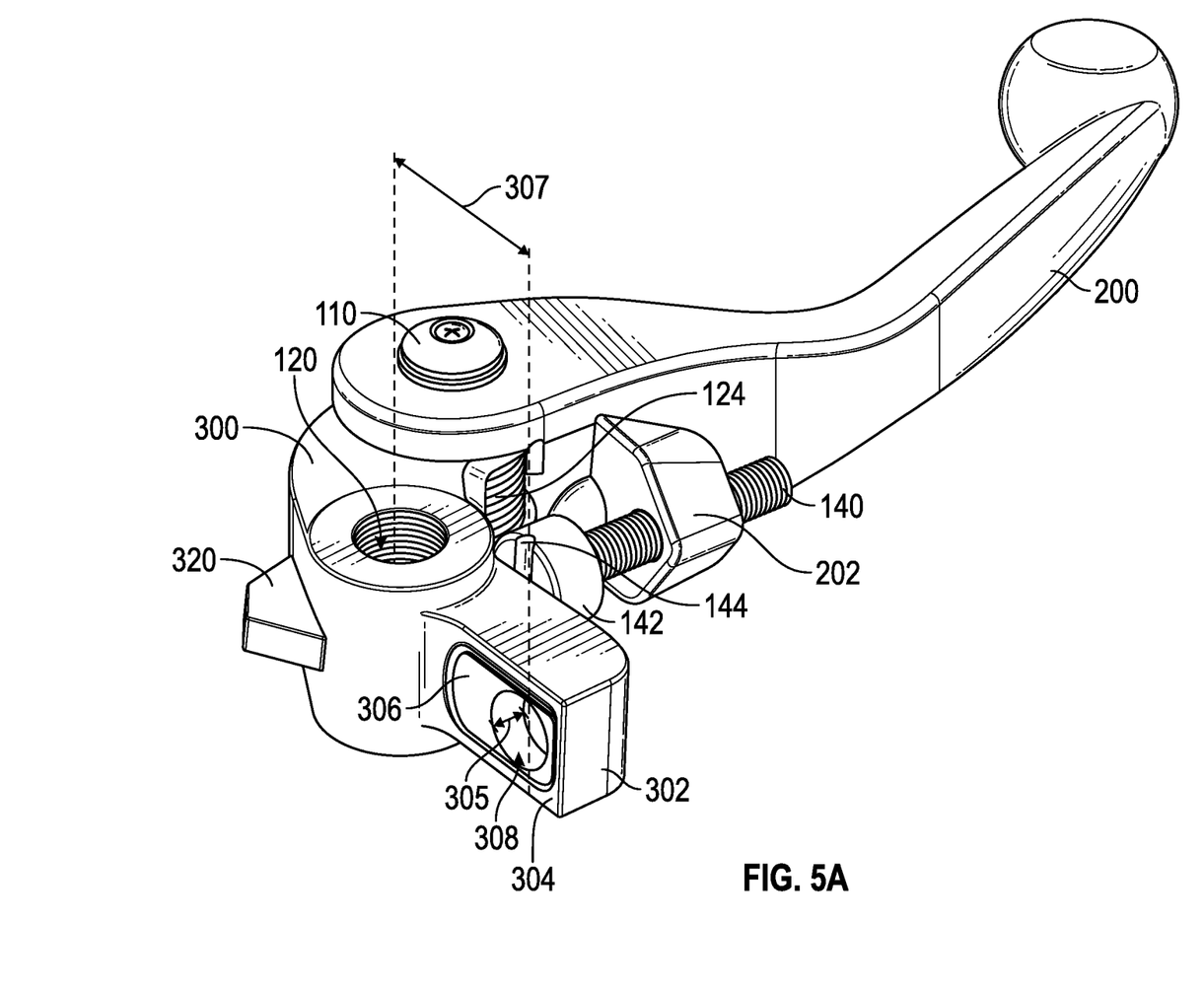
FIG. 5A is an isometric view of the knee and lever portion of the brake assembly of FIG. 1.

FIG. 5A depicts an isometric view of the knee 300 and lever 200. The knee 300 can include an extension 302 adapted to engage at least a portion of the pushrod 442. The extension 302 can include a piston-facing surface 304. The piston-facing surface 304 can be configured to compress against the pushrod 442 as the lever 200 is rotated about the pivot 120 toward the extension 302.

The piston-facing surface 304 can be adapted to receive an insert 306. For example, the piston-facing surface 304 can include a recess 301 (shown in FIG. 5B) adapted to receive the insert 306. The insert 306 can include a cavity 308. The cavity can have a depth 305 and be located at a radius 307 from the pivot 120. The cavity 308 can be configured to receive at least a portion of the pushrod 442. As mentioned above, the pushrod 442 can articulate with respect to the piston 440, allowing the pushrod 442 to maintain contact with the cavity 308 as the knee 300 swings in an arc about the pivot 120.

Figure 7A:
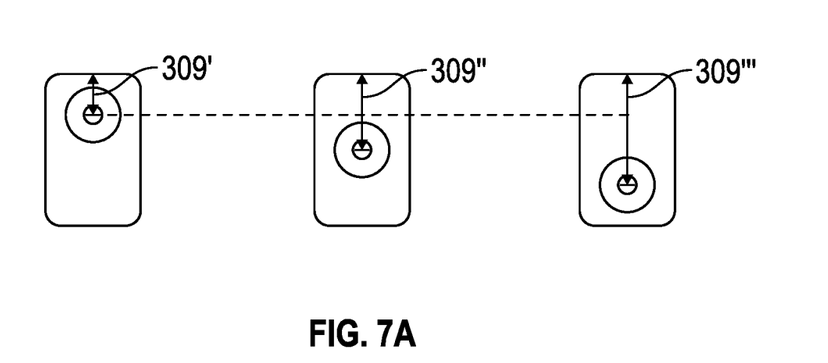
FIGS. 7A and B show front and side views of inserts having different cavity configurations.
Figure 7B:
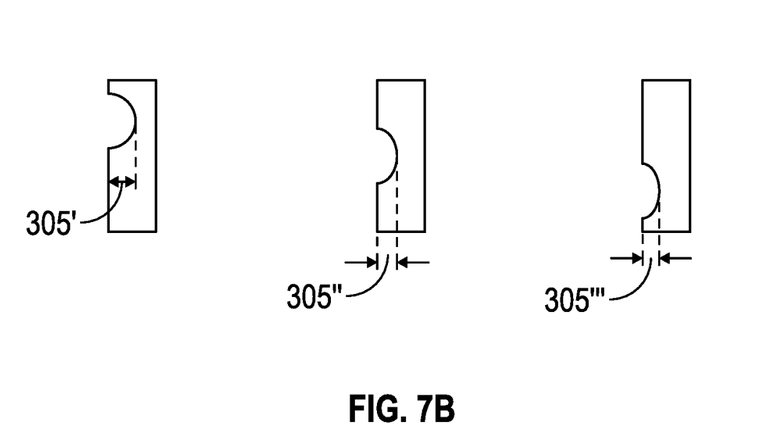

Referring to FIGS. 7A and B, the brake assembly 100 can include a plurality of inserts 306, with some, all, or none of the inserts 306 having a different depth 305 and/or distance 309 from an edge of the insert 306. Changing the distance 309 of the cavity 308 from the edge of the insert 306 will result in a change in the radius 307. The depth 305 and/or radius 307 of the insert 306 can be selected to produce a desired leverage ratio between the lever 200 and the pushrod 442. In some variants, the depth 305 and/or radius 307 of the cavity 308 can be modified to accommodate rider preference and/or the course conditions. In some variants, as the distance 309 is increased, the depth 308 of the cavity can decrease to accommodate the change in angle at which the pushrod 442 engages the insert 306. The pushrod 442 can articulate to allow the pushrod 442 to engage one or more cavities 308 that have a different depth 305 and/or radius 307.

The insert 306 and the piston-facing surface 304 can be configured to allow the insert 306 to be inserted into the extension 302 in a different orientation. For example, the insert 306 can be adapted fit into the extension 302 when the insert 306 is oriented in two orientations that are 180 degrees apart. As illustrated in FIG. 5A, in some embodiments the insert 306 can be rotated 180 degrees in the plane of the piston-facing surface 304 so that the cavity 308 still faces the pushrod 440 but has a different radius 307 with respect to the pivot 120. In this way, three inserts can be adapted to make six leverage ratios. The insert 306 can also include a second cavity 308 on the opposing surface of the insert 306, allowing a user to flip the insert 306 over so that the cavity 308 on the opposing surface now faces the pushrod 442. The cavity 308 on the opposing surface can have a depth 305 and/or radius 307 that is different from the cavity 308 on the other surface of the insert 306.

Figure 5B:
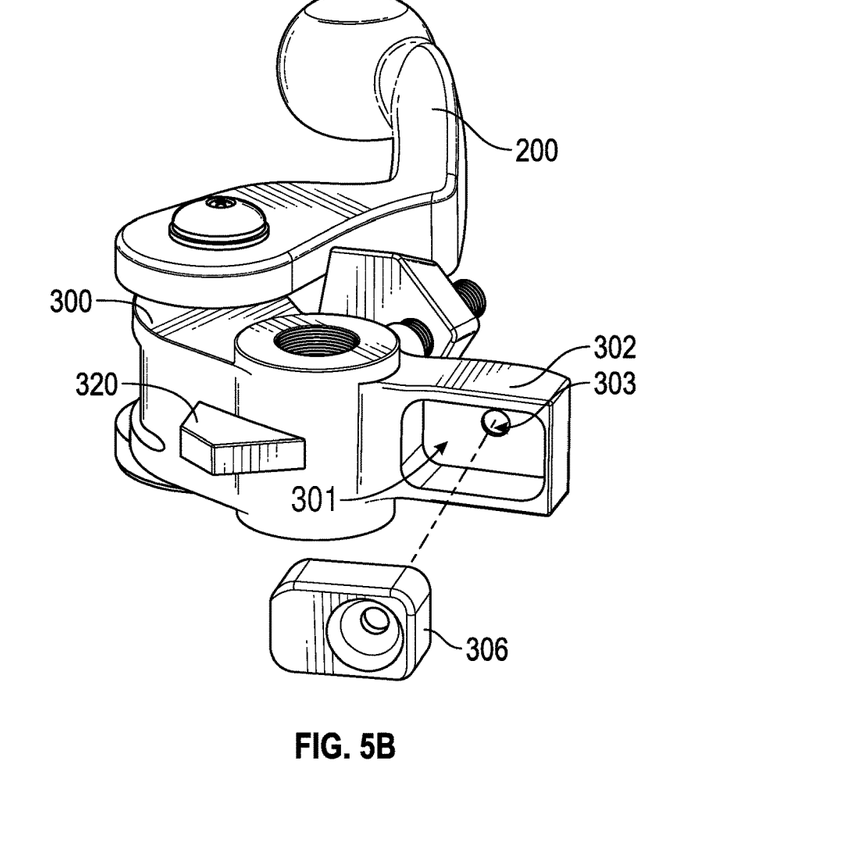
FIG. 5B is an assembly view of the knee and lever portion of FIG. 5A.

FIG. 5B depicts an assembly view of a non-limiting, illustrative embodiment of the knee 300, showing how the insert 306 can be configured to fit into a recess 301 of the knee 300. The knee 300 can include a port 303 that facilitates removal of the insert 306 from the knee 300. As illustrated in FIG. 5B, the port 303 can be a hole that allows a pin to be inserted through the port 303 and push the insert 306 out of the recess 301.

The knee 300 can also include a stop 320. The stop 320 can be configured to contact an abutment 450 (shown in FIG. 6). As discussed below, the brake assembly can be configured to allow the contact point between the top 320 and the abutment 450 to be adjusted.

Lever

Referring to FIG. 5A, the lever 200 can be coupled to the adjustment element 140 by the coupling element 202. The coupling element 202 can include an internal thread that mates with an external thread on the adjustment element 140. The brake assembly 100 can include a biasing element 124 that can be configured to compress the adjustment element 140 against a fin 310 (shown in FIG. 1). The biasing element 124 can be, for example, a torsion spring that surrounds the pin 110. The adjustment element 140 can include a head 142 that has one or more grooves 144 that are configured to receive the fin 310. The head 142 can include two or more grooves 144 that are substantially perpendicular to one another. The head 142 can include two grooves 144 that are not substantially perpendicular to one another. For example, the head 144 can include four grooves that are 45 degrees apart from one another.

The adjustment element 140 can be a "no-tool" adjuster. The position of the adjustment element 140 relative to the lever 200 or knee 300 can be adjusted by pushing the lever 200 against the biasing element 124 to free the head 142 from the fin 310, thereby allowing the head 142 to be set to a different position relative to the lever 200. As illustrated in FIG. 5A, the adjustment element 140 can be adjusted to a different position by turning the head 142 of the adjustment element 140 after the head 142 has been freed from the fin 310, thereby changing the position of the head 142 relative to the coupling element 202. In some variants, turning the head 142 can cause an external thread on the adjustment element 140 to advance along an internal thread of the coupling element 202, thereby causing the head 142 to move longitudinally toward or away from the coupling element 202. The biasing element 124 can be configured to compress the groove 144 against the fin 310, thereby blocking the adjustment element 140 from moving when the lever 200 is not extended against the biasing element 140. Further details of the lever are discussed in U.S. Pat. No. 7,921,747, entitled "COLLAPSIBLE CONTROL LEVER," filed on Jan. 5, 2005, and which is incorporated herein by reference in its entirety.

Guard

Figure 6:
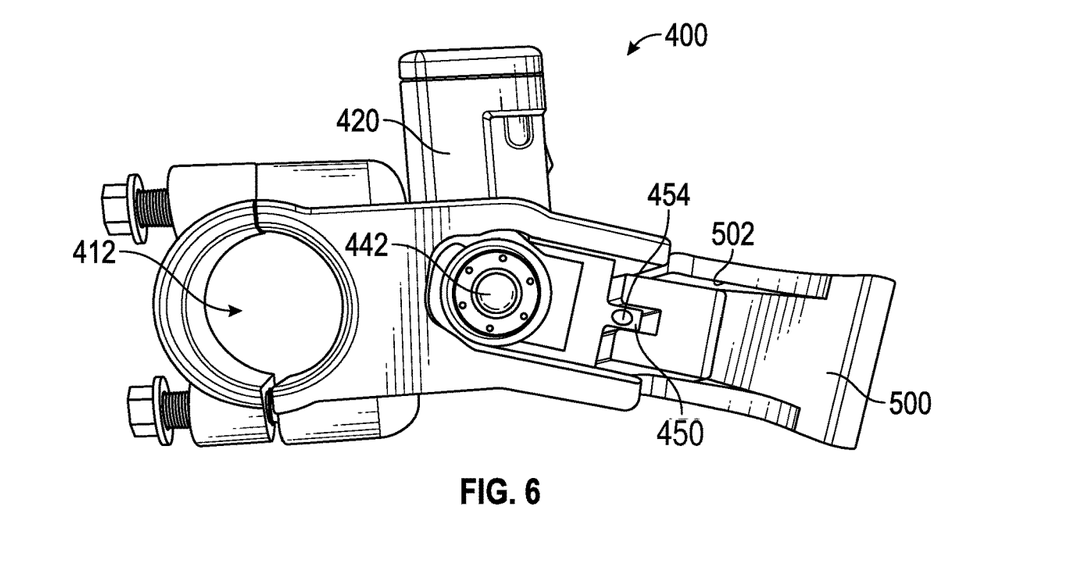
FIG. 6 is an end view of the guard and master cylinder assembly of FIG. 4.

FIG. 6 is a side view of the master cylinder assembly 400 and the guard 500. The guard 500 can include one or more flanges 502. As illustrated in FIG. 1, the flange 502 can cover at least a portion of the knee 300. The clearance between the flange 502 and the knee 300 can be small, allowing the flange 502 to act as a wiper for removing mud or other debris from the knee 300, for example, as the knee 300 rotates about the pivot 120. The clearance can be between about 0.1 mm and about 5 mm, between about 0.5 mm and about 3 mm, and between about 1 mm and about 2 mm. In some variants, the knee 300 can be exposed from the guard 500 when the brake is applied, resulting in debris accumulating on the knee 300 and/or lever 200. When the brake is released, the knee 300 moves back under the guard 500 and the flange 502 wipes debris off of the knee 300 and/or lever 200, thereby keeping the knee 300 and/or lever 200 clear of debris.

As discussed above, the brake assembly 100 can include an abutment 450 that engages a stop 320 on the knee 300. The abutment 450 can be positioned on the master cylinder assembly 400 or on the guard 500. The abutment 450 can include a cap surface 454 that contacts the stop 320. The cap surface 454 can be adjustable to allow the brake lever assembly 100 to be tuned to rider preference and/or course conditions. For example, the cap surface 454 can be a threaded screw (e.g., a set screw) that can be advanced longitudinally away from or toward the master cylinder assembly 400, thereby changing the rotational angle of the knee 300 at which the stop 320 contacts the cap surface 454. In some variants, the cap surface 454 can be adjusted to accommodate the pushrod 442 having a longer or shorter length and/or to accommodate the cavity 308 having a greater or lesser depth 305.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A brake assembly comprising:
   a pushrod of a master cylinder assembly;
   a knee coupled to the master cylinder assembly by a pivot;
   a lever coupled to the knee, the lever configured to compress the pushrod with the knee and apply a brake when the lever rotates about the pivot in a first direction;
   a recess disposed in a piston-facing surface of the knee;
   an insert sized to fit within the recess, the insert comprising a first cavity disposed on a first surface of the insert and a second cavity disposed on a second surface of the insert, wherein each of the first and second cavities is configured to receive at least a portion of the pushrod, wherein the second cavity faces away from the pushrod when the first cavity receives the at least a portion of the pushrod.

2. The brake assembly of claim 1, wherein the first surface is opposite the second surface.

3. The brake assembly of claim 1, wherein the first cavity has a first depth that is different from a second depth of the second cavity.

4. The brake assembly of claim 1, wherein the first cavity has a first radius away from the pivot when the insert is coupled to the lever so that the first cavity faces the pushrod, and wherein the second cavity has a second radius away from the pivot when the insert is coupled to the lever so that the second cavity faces the pushrod, the first radius different from the second radius.

5. The brake assembly of claim 1, wherein an outer surface of the master cylinder comprises a ridge that extends along a direction that is parallel with a longitudinal axis of the cylinder.

6. The brake assembly of claim 1, wherein the lever and the knee are each a portion of a continuous unitary structure.

7. The brake assembly of claim 1, wherein the lever is coupled to the knee by a pin, the lever adapted to rotate about the pin.

8. The brake assembly of claim 7, further comprising an adjustment element adapted to allow adjustment of a rest position of the lever relative to the knee.

9. The brake assembly of claim 1, further comprising a cap surface disposed on an abutment of the master cylinder, the cap surface adapted to contact a stop on the knee.

10. The brake assembly of claim 9, wherein the abutment is adjustable along a longitudinal direction of the master cylinder to thereby define a rotational angle of the knee at which the stop contacts the cap surface.

11. A brake assembly comprising:
    a pushrod of a master cylinder assembly;
    a knee coupled to the master cylinder assembly by a pivot;
    a lever coupled to the knee, the lever configured to compress the pushrod with the knee and apply a brake when the lever rotates about the pivot in a first direction;
    a recess disposed in a piston-facing surface of the knee;
    an insert sized to fit within the recess in a first orientation and in a second orientation, the insert comprising a cavity configured to receive at least a portion of the pushrod, wherein a first radius is defined between the cavity and the pivot when the insert is in the first orientation, wherein a second radius is defined between the cavity and the pivot when the insert is in the second orientation, the first radius different from the second radius.

12. The brake assembly of claim 11, wherein the first orientation is 180 degrees apart from the second orientation.

13. A brake assembly comprising:
    a pushrod of a master cylinder assembly;
    a knee coupled to the master cylinder assembly by a pivot;
    a lever coupled to the knee, the lever configured to compress the pushrod with the knee and apply a brake when the lever rotates about the pivot in a first direction;

a recess disposed in a piston-facing surface of the knee;
an insert sized to fit within the recess, the insert comprising a first cavity disposed on a first surface of the insert and a second cavity disposed on a second surface of the insert, each of the first cavity and the second cavity configured to receive at least a portion of the pushrod, wherein the second surface faces away from the pushrod when the pushrod is received in the first cavity; and
a hole disposed on the recess and sized to allow a pin to be inserted through the hole to push the insert out of the recess.

* * * * *